May 27, 1952
B. M. S. KALLING ET AL
2,598,393
METHOD IN CARRYING OUT TREATMENT OF MELTED
PIG IRON OR OTHER ALLOYED IRON
Filed Oct. 24, 1949
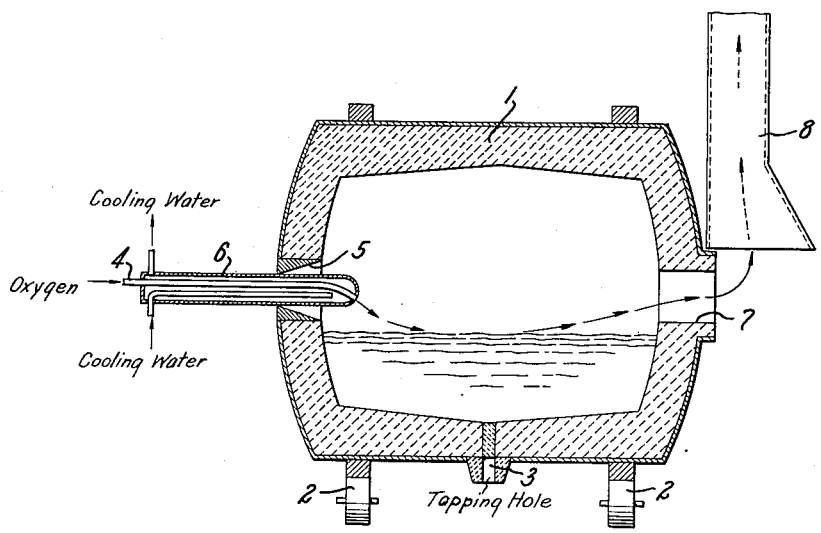
Inventors:
Bo Michael Sture Kalling
Oskar Lennart Lindskog
By Pierce, Scheffler & Parker
Attorneys.

UNITED STATES PATENT OFFICE 2,598,393

METHOD IN CARRYING OUT TREATMENT OF MELTED PIG IRON OR OTHER ALLOYED IRON

Bo Michael Sture Kalling, Domnarvet, and Oskar Lennart Lindskog, Borlange, Sweden Application October 24, 1949, Serial No. 123,304
In Sweden October 25, 1948

10 Claims. (Cl. 75—60)

The present invention relates to the type of oxidizing treatment of pig iron or other iron alloy in molten condition, in which the heat necessary for carrying out the oxidation and for maintaining the molten bath at a suitable temperature is generated by reaction between free oxygen and the oxidizable constituents of the starting material which it is desired to remove in the form of oxides.

Through this new invention are simultaneously effected a number of important objects and advantages some of which may be obtained separately or in certain combinations but never all together in any hitherto known process of this kind.

One such object comprises the improvement of the heat economy by making possible the utilization of pure oxygen gas or oxygenated air for the oxidation due to which a considerable quantity of cold scrap iron may be added to the molten bath. The heat economy is further improved by the possibility in the new process, without disadvantages, completely to burn within the furnace chamber all the carbon monoxide formed by oxidation of carbon in the bath.

Another such object relates to diminishing iron losses as iron oxides caused by oxidizing iron with the oxygen added to the bath which iron oxides enter into the slag.

A further object is to reduce the evaporation of iron with the formation of fumes which can not be avoided by using gases high in oxygen in the hitherto known processes of this type and which fumes besides a considerable iron loss cause severe sanitary disadvantages.

A further object of the invention is to reduce the absorption of nitrogen in the steel produced.

A further object is to enable control of the oxygen supply in order to make it possible to influence the reactions in the desired direction.

Still a further object according to the invention is to make possible the supply of the oxidizing gas at an exceptionally low pressure.

Other objects of the invention and advantages to be derived from its use in practice will become apparent from the following description.

In carrying out oxidizing treatments of the type under consideration the Bessemer process and some modifications of the same have been used for a long time. The Bessemer process comprises substantially the steps of introducing molten pig iron into a converter and supplying atmospheric air or oxygenated air through twyers in the bottom of the converter. During its passage through the bath the oxygen of the gas will firstly oxidize those components of the pig iron which have a greater affinity to oxygen than iron such as silicon, manganese, carbon and in the basic process also phosphorus.

The air blown through the bath has for its purpose besides bringing about the oxidation to create such a rapid movement in the bath that the reactions will rapidly approach equilibrium whereby the iron preliminarily oxidized by means of the oxygen will be reduced again by the more easily oxidized alloying constituents. The heat required to keep the iron in molten condition and in a necessary degree to increase the temperature during the treatment is in this case liberated by the reaction between supplied oxygen and the alloying constituents.

In the Bessemer process the oxygen supply, the stirring of the bath and the heat development are entirely dependent of each other. Further as the supply of oxygen for technical reasons has certain maximum and minimum limits the primary disadvantage of this process is that the possibility of variations of the same are restricted. Thus, it is impossible to reduce the supply of oxygen below a certain limit because the pressure of the gas supplied must always be at least sufficiently high that the iron is prevented from leaking through the twyers.

For improving the heat economy of the Bessemer process it is further desirable to be able to carry out the oxidation by means of pure oxygen gas or a highly oxygenated air. The oxygen content of the gas, however, is limited by the ability of the furnace bottom around the twyers to withstand high temperature. At an oxygen content of about 40% in the supplied gas the strength of the furnace bottom begins to decrease severely due to the local high temperature occurring when the oxygen contacts the iron bath and the utilization of pure oxygen is made entirely impossible for this reason. This is a great drawback as particularly in the case of bottom blowing it is an important desideratum to keep the nitrogen content of the gas as low as possible for enabling the production of a steel low in nitrogen. Further when using the bottom blowing process the combustion heat of the carbon is unsatisfactorily used because the carbon monoxide formed will be burned to carbon dioxide only after leaving the converter so that the heat generated can not be utilized for the process.

In the other process of this type, viz. the so-called side blowing process, the oxidizing gases are not introduced through openings in the bottom of the converter but through twyers in the side walls of the converter near the surface of the iron bath. Also in this case the gas serves to bring about the stirring necessary in the bath and to oxidize alloying constituents. The stirring action in this case of course is less because of which the reaction will not be as complete as in the bottom blowing process resulting in considerably increased iron losses in the slag. The heat economy, however, is better than in the bottom blowing process as the gasses formed by the oxidation are completely burned when leaving the converter. Because of the less stirring action the bath is more extensively superheated locally in places where the oxygen enters into contact with the iron bath especially when using oxygenated air or pure oxygen causing the disadvantage that a considerable part of the iron and possibly also manganese is evaporated involving a substantial decrease in the iron yield and also the formation of great quantities iron fumes, which may be very annoying from a sanitary point of view. The extremely fine particles of iron are very difficult to separate from the gases according to known methods for the purification of gases. In the side blowing method there is also when using oxygenated air the same disadvantage as in the bottom blowing method that the lining of the twyer openings is severely attacked. Compared with the bottom blowing methods the side blowing methods have the advantage that the nitrogen content of the steel is less because of the nitrogen of the gas supplied not coming into such an intimate contact with the iron.

It has been proposed to carry out oxidizing treatments of the type under consideration by supplying high pressure oxygen gas through twyers and the like directed against or introduced through the surface of the bath. By proceeding in this way it is possible to prevent local attacks upon the furnace lining but as this method has been carried into practice it has been impossible to obviate considerable iron losses through oxidation as well as formation of iron fumes.

According to the present invention the advantages mentioned above are obtained while obviating the disadvantages of the known processes by avoiding stirring action by the supply of the gas used for the refining process. In the following the invention will be fully described in connection with the use of a rotating furnace for bringing about the stirring action. For bringing the invention into practice it is obvious, however, that other means may be used for stirring the bath, as e. g. of the mechanical or electrodynamical kind.

The idea of using rotating furnaces in the production of steel is not new per se as it has been proposed to use rotating furnaces when melting and treating steel. For this purpose slowly rotating furnaces have been used which essentially are operated according to the open hearth process (Martin process) and in which the main object of the rotation is to facilitate the heat transmission to the metal which is melted and superheated by blowing high temperature combustion gases through the furnace. In the process according to the invention the main object is to obtain a sufficiently intense movement in the iron bath by rotating the furnace for obtaining an intense contact between the bath and the oxygen containing gas supplied for oxidizing the components to be oxidized at such a high reaction velocity that external supply of heat is superfluous and for obtaining such a reaction between the bath and the slag that the content of iron oxides in the slag may be re-reduced.

Summarizing it may be said that in the known processes the rotating furnace substantially is used for improving the heat transmission in a method, which otherwise corresponds to the open hearth processes while the invention relates to a rapid refining process substantially coinciding with the Bessemer process. In the first mentioned process the result aimed at is obtained through a relatively slow stirring while according to the invention a rapid stirring action is necessary as a stirring of the type according to known processes has proved to be insufficient for giving satisfactory results.

A furnace of the type referred to above is illustrated in the accompanying drawing which is an axial section of the furnace. In the drawing, 1 is the furnace body which is mounted for rotation on rollers 2. 3 is a tapping hole. Oxygen is supplied through pipe 4 which extends through the axial opening or tuyère 5 in one end of the furnace and is provided with the water cooling jacket 6. 7 is an outlet opening for waste gas and 8 the flue therefor.

Although air and other gas mixtures relatively high in oxygen may be used in the process according to the invention the advantages of the process become more apparent when using gas mixtures rich in oxygen, e. g. with oxygen contents above 50%, or pure oxygen. If the process is carried out in a stationary furnace and a gas rich in oxygen is supplied to the bath from above it is very difficult to prevent a considerable part of the iron from being oxidized before the process has gone to an end. By rotating the furnace rapidly it is, however, possible also when using pure oxygen to reduce the iron content in the slag to an acceptable amount.

The disadvantages mentioned above due to the formation of iron fumes are decreased or completely obviated when using a rotating furnace as the strong stirring action will equalize the oxygen supply to the bath and prevent local superheating.

When the process is carried out in a rotating furnace it is not necessary to supply the oxygen with such a high pressure as in the common Bessemer process. Also when a considerable quantity of slag is present in the furnace it is possible to obtain a rapid reaction only by rotating the furnace with a sufficient speed of rotation. Said speed ought to be so high that through the resulting stirring action the iron in the bath will pass through the slag so that a direct contact between the iron and the gas is obtained over a certain part of the surface. However, it has been found that a rapid refining action may be obtained also without such a direct contact if only the slag is sufficiently free-flowing and the slag layer is not too thick. In processes in which larger slag quantities are formed it may be desirable to pour off the slag continuously or intermittently for facilitating the reaction.

In such case the oxygen must not necessarily be supplied through a twyer directed against the bath but may preferably be supplied axially to the furnace through a wide nozzle in a central opening in one of the end walls of the furnace. When doing so the advantage is obtained that the oxygen before it reaches the bath is mixed with the furnace gas thus avoiding local superheating and also the formation of fumes.

If when using a gas rich in oxygen it is desirable to increase the stirring action by blowing the gas under pressure against or into the bath it may be suitable to mix the gas with another gas before it contacts the iron for reducing the formation of iron fumes. This may be done by mixing the oxygen containing gas before introducing the same into the furnace with another gas containing carbon dioxide and/or water vapor or by mixing it with reaction gases from within the furnace. This latter mixing may be carried out outside the furnace but it is preferably carried out within the furnace by constructing the oxygen twyer as an ejector so that the furnace gas is sucked up with the oxygen and mixed with the same before the gas jet reaches the bath. In this case it is of course important that the circulating furnace gas does not contain combustible gases but that the combustion within the furnace is complete.

In the basic Bessemer process (Thomas process) in which great quantities of burnt lime 12–15%) are to be supplied to the bath at the beginning of the treatment it is very difficult to carry out the treatment in a stationary furnace if the oxygen is supplied from above through twyers directed toward the bath even if a high gas pressure is used. The great quantity of lime in this case prevents the gas from coming into effective contact with the iron bath. In the rotating furnace these difficulties are obviated and it is possible also when using very large quantities of lime to carry out the process without using high pressure gas.

This oxidation process with uncombined oxygen in a rotating furnace may with advantage be used both for the entire process when transforming pig iron or other alloyed iron into steel and also for certain parts of this process. The process may be carried out in acid as well as basic lined furnaces and in the later case pig iron rich in phosphorous may with advantage be used as a starting material. When using highly concentrated oxygen the heat economy of the process will be very good and the temperature conditions may be controlled as desired independently of the chemical composition of the pig iron. A great excess of heat is always produced and may be used for simultaneously melting cold material, e. g. scrap iron or iron ore for partial refining with iron ore. Due to the rotation of the furnace during the process the combustion of carbon monoxide into carbon dioxide does not involve any risk of the temperature in the furnace lining rising to dangerous level above the bath surface.

In a rotating furnace it is further possible to carry out reactions which have been completely impossible to carry out in furnaces of other types. In carrying out the oxidizing treatment under consideration according to the known processes the reaction stops when the supply of air or oxygen is cut off. The process as a whole must be carried out under strongly oxiding conditions. In certain cases this is a very serious drawback, e. g. when it is desirable substantially to remove a certain element without simultaneously incurring excessive iron losses. When using a rotating furnace it is possible to carry out the last stage of the process in a neutral atmosphere by disconnecting the oxygen supply at a suitable moment and continuing the rotation until the reaction between the iron bath and the slag has reached the desired extent.

This procedure may be carried out several times during the treatment for transforming pig iron into steel. If it is considered desirable to draw off the slag from the furnace at one or several times it is preferable to carry through such a rotation in neutral atmosphere before each drawing off of the slag takes place and this mainly for decreasing the iron content of the slag and the coincidental iron losses. Especially when ending the process in connection with finishing the steel such a treatment may be desirable also for decreasing the carbon content and under certain circumstances also the oxygen content of the steel. This stirring in neutral atmosphere is also very important for effectively removing phosphorous in a furnace with basic lining, as it will be possible to decrease the phosphorus content to harmless amounts without any appreciable increase in the iron losses even when using a starting material rich in phosphorous. If the slag is drawn off when the main part of the phosphorous is chemically bound in the slag and by adding lime and possibly also some iron ore and continuing the process without supplying oxygen at least during the end period it is possible to obtain a high degree of removal of phosphorous. It is preferable to keep the bath at such elevated temperature that it is possible to obviate supply of oxygen after the slag is drawn off. In the process according to the invention it is also possible to obtain a slag rich in phosphorous even when the pig iron is low in phosphorous which is difficult to achieve when using a basic Bessemer process or a refining process using ore.

According to the invention it is also possible to obtain effective removal of sulphur in the Bessemer treatment especially when the process is carried out in a furnace with basic lining. If lime is added at the beginning of the process the lime always absorbs a certain amount of sulphur irrespective of whether slag is formed or not if the process is carried out in a converter. Removal of sulphur is, however, highly counteracted if the reaction takes place under oxidizing conditions. When carrying out the process in a rotating furnace the addition of lime is adjusted so that a not too viscous basic slag is obtained at the beginning of the treatment and thereafter the oxygen supply is cut off and the rotation is continued whereby it is possible to obtain a high degree of removal of sulphur. The sulphur containing slag may then be drawn off and the treatment continued. The good result obtained in this case also is due to the ability to rapidly increase the temperature in the bath to a required extent by using a gas rich in oxygen before too great a part of the more reducing elements in the pig iron and primarily the carbon has decreased too much whereby the succeeding equalization may be carried through under sufficient reducing conditions which is essential if the sulphur is to be removed completely or substantially completely. If the silicon content of the pig iron is high it may be preferable firstly to add a small quantity of lime so that the initially formed slag will be acid and then draw off this slag and add a new quantity of lime for the formation of a basic and sulphur binding slag. Also when the sulphur content of the pig iron is high it may be preferable to apply such a refining treatment in two steps. When using pure oxygen gas in the process the end product is necessarily always low in nitrogen. It is, however, also possible when using nitrogen containing gas to obtain a substantially lower nitrogen content in the steel than is normally possible in a common Bessemer process or in the side blowing process, if during the carbon removal the air supply is cut off for a period and the rotation of the furnace is continued in neutral atmosphere. The refining then continues without supply of nitrogen and the nitrogen content of the bath is lowered.

The process may advantageously be carried out in a furnace shaped as a rotating drum. The oxygen containing gas may in this case be supplied at a relatively low velocity through a water cooled twyer introduced through the central part of one end wall and the reaction gases are drawn off through the corresponding opening in the opposite end wall. The iron treated and possibly also the slag may be drawn off through an opening in the furnace lining which is closed during the rotation. It is also possible to draw off the slag through the opening for reaction gases by tilting the furnace axially. The furnace may also be rotated in such a position that at least slag may be drawn off when the furnace is rotating. This is especially of importance because thus it is possible to continuously draw off slag during the process.

It must be possible to vary the rotational speed of the furnace within wide limits as the most suitable rotational speed varies depending on the starting material and also on the altered chemical composition during the process. Thus the formation of iron fumes is most intense in the beginning and is counteracted by a rapid stirring with accompanying increased rotational speed. At the end the iron losses in the slag increase and also are counteracted by a rapid stirring. Rapid stirring is also often desirable from a metallurgical point of view but involves increased wear of the lining. For decreasing this wear it is for economical reasons recommendable to use an increased rotational speed only when necessary and to lower the speed when possible without disadvantage. Trials have shown that the inside wall of the furnace preferably is to be given a peripheral speed of at least 1 m per second, at least during certain periods. In certain cases the best results have been obtained with a peripheral speed of 2 m per second or still higher.

When in this specification the term "pure oxygen gas" is used it is intended to cover chemically pure oxygen gas with an oxygen content higher than 99% as well as technical pure oxygen gas with an oxygen content higher than about 85%. The term "air enriched in oxygen" or "oxygenated air" is intended to comprise air with an oxygen content higher than that of atmospheric air and lower than the lower limit stated above for technical oxygen gas.

For illustrating the results obtainable according to the invention some data are given from two heats which were carried out in such a way that they chemically correspond to the common basic Bessemer process. The heats were treated in the same furnace which was rotatable and had the form of a horizontal cylinder with central openings in both end walls. The internal diameter was about 1500 mm. as was also the internal length. The oxidation was carried out with a 99 per cent oxygen gas which was introduced into the furnace and directed obliquely against the bath through a water-cooled twyer introduced through the opening in the one end wall and the reaction gases were discharged through an opening in the opposite end wall. The furnace was lined with tar dolomite. At the beginning of the treatment a quantity of burnt lime for forming the basic slag was added. The furnace could not be tilted axially but the part of the slag formed in both cases flowed out of the furnace through the gas opening a while before the end of the treatment. The total period of treatment in both cases was about 30 minutes but the total furnace time in both cases amounted to about one hour due to the often repeated sampling. In heat 1 20% cooled scrap iron was added but in spite of this the temperature at the end of the treatment was normal. In heat 2 no scrap iron was added for lowering the bath temperature as in this case the charge had a tendency to become too cold substantially due to the fact that the furnace at the beginning of the treatment had a lower temperature than in the first mentioned case. The most important difference between the treatment of the two heats was that the gas pressure was higher for heat 2 than for heat 1 and that the rotation speed for heat 2 was about 10 times higher than for heat 1, at which the speed was relatively low.

| | Heat 1 | Heat 2 |
|---|---|---|
| Pig iron, kgs | 1,900 | 1,950 |
| Scrap iron, kgs | 380 | |
| Burnt lime, kgs | 176 | 250 |
| Oxygen gas, kgs | 102 | 186 |
| Gas pressure, kgs/cm.² | 1.5–3.0 | 5–11 |
| Diameter of the twyer nozzle, inches | ½ | ⅜ |
| Rotation speed of the furnace, revolutions per minute | 4 | 40 |

From the analysis and the course of the treatment the following may be stated:

*Analysis*

HEAT 1

| Time from the beginning of the treatment in minutes | Analysis of the iron bath | | | | | | Analysis of the slag | | | | | |
|---|---|---|---|---|---|---|---|---|---|---|---|---|
| | C | Si | Mn | P | S | N | Fe | MnO | SiO₂ | CaO | MgO | P₂O₅ |
| 0 | 2.82 | 0.50 | 0.80 | 1.55 | 0.025 | 0.003 | | | | | | |
| 8.7 | 2.24 | 0.09 | 0.36 | 1.05 | 0.040 | 0.004 | | | | | | |
| 14.3 | 1.58 | | | 0.370 | | | 14.5 | 4.9 | 10.0 | 40.0 | 11.2 | 13.6 |
| 20.1 | 1.25 | | | 0.096 | | | | | | | | |
| 24.7 | 0.55 | | 0.19 | 0.041 | 0.023 | 0.003 | 17.4 | | | 42.7 | | 13.7 |
| 27.7 | 0.56 | | | 0.046 | | | | | | | | |
| 31.3 | 0.09 | | | 0.029 | | | 22.4 | | 6.1 | 37.2 | 9.2 | 11.5 |
| 33.8 | 0.04 | | 0.04 | 0.027 | 0.023 | 0.003 | 28.4 | 3.8 | 5.0 | 33.8 | 11.0 | 8.7 |

HEAT 2

| | C | Si | Mn | P | S | N | Fe | MnO | SiO₂ | CaO | MgO | P₂O₅ |
|---|---|---|---|---|---|---|---|---|---|---|---|---|
| 0 | 2.88 | 0.22 | 0.86 | 1.30 | | | | | | | | |
| 22.6 | 0.80 | | | 0.785 | | 0.007 | | | | | | |
| 28.0 | 0.36 | | 0.23 | 0.080 | | | 6.3 | 3.5 | 6.6 | 57.1 | 6.0 | 15.1 |
| 33.0 | 0.14 | | 0.09 | 0.017 | | | 13.8 | 3.6 | 6.5 | 48.1 | 5.8 | 12.8 |

The iron content in the slag was substantially lower in heat 2 than in heat 1 which is due to more elevated basicity which partially is due to the higher basicity of the slag but substantially is due to the higher rotational speed. The iron content of the slag in heat 2 is fully comparable with good results from common basic Bessemer iron obtained in converter blown from the bottom. If the air is blown from above against an iron bath in a stationary furnace it is very difficult to bring the phosphorus content below 0.050% without the iron content of the slag simultaneously rising to or above 20% as shown by comparative trials. Due to the rotation, especially when using a high rotational speed, it is thus possible to obtain a substantial improvement in the iron yield which improvement may rise to 2–3% or even more if the slag quantities are great.

In heat 2 the surprising and important result was obtained that practically no iron fumes were formed in spite of the elevated pressure with which the oxygen gas in this case was blown against the bath. The rotation speed was thus sufficient for causing the necessary equalizing of the temperature. At heat 1 about 1% of the iron was gasified involving a vigorous formation of fumes.

In spite of the long furnace time 20% scrap iron was melted in heat 1 during the treatment and a normal end temperature was obtained. This fact indicates that when using larger furnaces and operating continuously it may be possible to melt a substantially greater amount of scrap iron or possibly instead of this to increase the yield by adding iron ore. The relatively high MgO content in the slag is not only due to slag attack on the furnace lining but depends for the greater part on the fact that the furnace was operated discontinuously because of which the dolomite lining of the furnace was decomposed due to the rapid cooling and heating between the charges. At heat 1 the consumption of oxygen gas was considerably less than at heat 2 which is due to the lower gas pressure, which also in this respect is an advantage. The oxygen may as a rule be supplied at a pressure of <1.5 kgs./cm.$^2$ and it is in most cases possible to carry out the process if the pressure of the gas is only so high that the gas quantity blown into the furnace chamber is sufficient for completing the refining process within a reasonable period of time.

As appears from the trials there is not obtained any shortening of the time necessary for the treatment. In this connection it is to be pointed out that a normal Bessemer process often runs too rapidly for the necessary control of the treatment conditions. In the method according to the invention it is possible to control the process completely and also to interrupt it by cutting off the supply of oxygen gas in which case the furnace atmosphere within a short time becomes neutral due to consumption of the oxygen so that only the iron bath and slag react with each other.

We claim:

1. A method of carrying out the treatment of iron alloys with oxygen-containing gases which comprises establishing a molten body of an iron alloy in a reaction chamber which is rotatable about a substantially horizontal axis and is of substantially circular cross-section perpendicular to said axis, said body filling less than half of said chamber and being at least partly covered by a molten slag, rotating said chamber for a period of time whereby said body is agitated but maintained unitary and introducing a gas which is free from combustible components and contains at least 40 per cent of oxygen into the space in said chamber at a point above said body and discharging reaction gases from said chamber during at least a part of said period of rotation, the peripheral speed of said chamber during at least a part of said period of rotation being at least 1 meter per second.

2. Method as defined in claim 1 in which the iron alloy is pig iron.

3. Method as defined in claim 1 in which the gas contains at least 50 percent of oxygen.

4. Method as defined in claim 1 in which the gas is technically pure oxygen.

5. Method as defined in claim 1 in which the gas is introduced into the chamber at a superatmospheric pressure not greater than 1.5 kg./cm$^2$.

6. Method as defined in claim 1 in which the alloy is pig iron and the flow of gas is stopped before the decarburization of the pig iron is complete and the rotation of the reaction chamber is continued.

7. Method as defined in claim 1 in which the alloy is pig iron high in sulfur, the slag is a basic sulfur-binding slag and in which the introduction of gas is interrupted when the body is at desulfurizing temperature but still has a high content of carbon, continuing the rotation of the chamber until the desulfurization is completed, removing the sulfur-binding slag, introducing a new slag and resuming the introduction of gas to effect decarburization of the pig iron.

8. Method as defined in claim 7 in which the final introduction of gas is stopped before the decarburization of the pig iron is complete and the rotation of the chamber is continued.

9. Method as defined in claim 1 in which the gas introduced into the chamber is diluted with gas of substantially the same composition as the reaction gases which are discharged from the reaction chamber prior to its introduction into the reaction chamber.

10. Method as defined in claim 1 in which the gas introduced into the reaction chamber is intermingled with reaction gases within the reaction chamber prior to contact thereof with the molten body.

BO MICHAEL STURE KALLING.
OSKAR LENNART LINDSKOG.

REFERENCES CITED

The following references are of record in the file of this patent:

UNITED STATES PATENTS

| Number | Name | Date |
|---|---|---|
| 76,581 | Allen | Apr. 14, 1868 |
| 223,481 | Chapin | Jan. 13, 1880 |
| 411,417 | Bookwalter | Sept. 24, 1889 |
| 412,721 | Bookwalter | Oct. 15, 1889 |
| 855,603 | Adams | June 4, 1907 |
| 1,032,653 | Brassert | July 16, 1912 |
| 1,032,655 | Brassert | July 16, 1912 |
| 1,839,927 | Neuhauss | Jan. 5, 1932 |
| 2,068,785 | Bain et al. | Jan. 26, 1937 |
| 2,074,164 | Clair | Mar. 16, 1937 |
| 2,093,666 | Vogt | Sept. 21, 1937 |
| 2,110,066 | Heuer | Mar. 1, 1938 |
| 2,209,153 | Dillon | July 23, 1940 |

FOREIGN PATENTS

| Number | Country | Date |
|---|---|---|
| 2,207 | Great Britain | of 1858 |
| 12,950 | Great Britain | of 1901 |
| 456,548 | Great Britain | Apr. 5, 1922 |
| 462,837 | Great Britain | Mar. 17, 1937 |
| 514,352 | Great Britain | Jan. 24, 1938 |